(No Model.)
G. R. MOORE.
VALVE AND PIPE ADJUNCT FOR GRADUATING THE FLOW OF OIL FROM TANKS.
No. 503,769.  Patented Aug. 22, 1893.
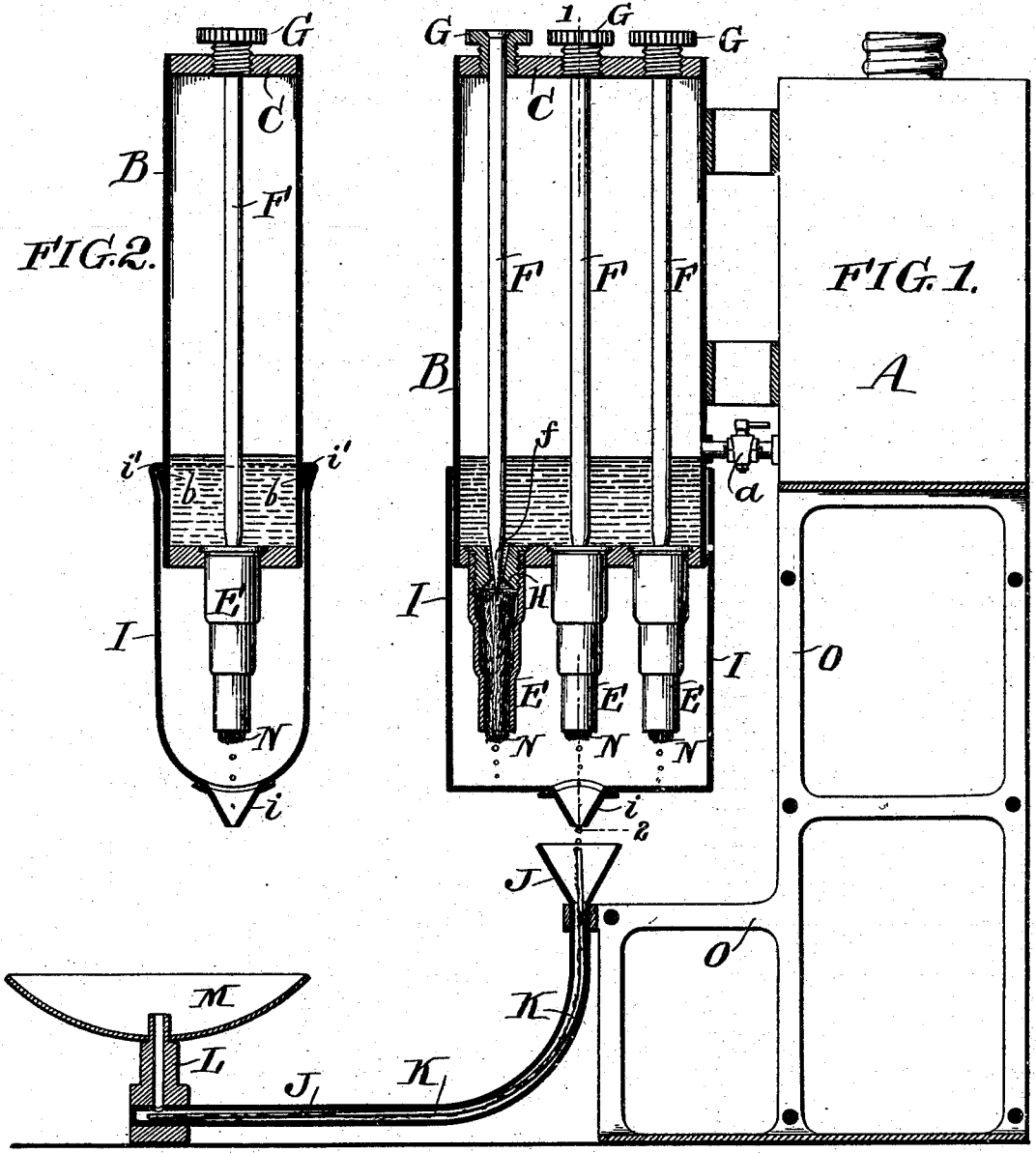
WITNESSES:
INVENTOR:
Geo. R. Moore

UNITED STATES PATENT OFFICE.

GEORGE RODNEY MOORE, OF PHILADELPHIA, PENNSYLVANIA.

VALVE AND PIPE ADJUNCT FOR GRADUATING THE FLOW OF OIL FROM TANKS.

SPECIFICATION forming part of Letters Patent No. 503,769, dated August 22, 1893.

Application filed November 23, 1892. Serial No. 452,940. (No model.)

*To all whom it may concern:*

Be it known that I, GEORGE RODNEY MOORE, a citizen of the United States, residing at Philadelphia, in the county of Philadelphia and State of Pennsylvania, have invented a new and useful Improvement in Valve and Pipe Adjuncts for Graduating the Flow of Oil From Tanks, of which the following is a specification.

The direct and present object of my invention is to provide a reliable means of obtaining a steady and even flow of oil from a tank, and graduating it to any desired degree. The flow required in some cases of oil-burners is very slight, often less than one drop per second, and the valves now used for that purpose will not give a uniform flow, and not even a practical result without frequent re-setting. A needle valve set to allow a flow of sixty drops of oil per minute; if left untouched for half an hour will be seen to have diminished that quantity a very perceptible degree; and to bring it up to sixty drops it must be reset, and thus continually. By my invention a reliable adjunct is provided for valves by which uniformity of flow is obtained automatically. Another difficulty is well known in obtaining a steady and prompt flow of oil through a very small pipe; it is seen suddenly to stop and is said to be "air bound;" for this I have provided a permanent remedy so that the oil from the tank, through the pipe to its place of use, passes continuously in uniform time, with no resetting of the valve. I attain these objects by mechanisms illustrated in the accompanying drawings in which—

Figure 1 is a vertical central section and elevation of the entire mechanism of the valve and pipe and their connections with a tank and a receiving bowl. A triad of valves with their adjuncts are shown in this figure. Fig. 2 is a cross section of the valve apartment taken on the line 1—2 of Fig. 1.

Similar letters indicate similar parts.

(A.) is the main oil-tank.

(B.) is an intermediary vessel in which the valves are located. It receives its supply of oil from the main tank through the valve (a.)

(C.) is the top plate, or cover to (B.) The screws by which the needle valves at the bottom of this vessel are operated are seen in this plate.

(E.) is a tube filled with lamp wicking, or other fibrous material and is attached, removably, to the under side of the valve seat, or the plate forming the bottom of the vessel (B.). It controls the outflow of the vessel (B.) either independently of the valve or in conjunction with it as the operator may determine.

(F.) is the valve spindle of a needle valve.

(f.) is the valve proper seated in the nipple to which (E.) is removably attached.

(G.) is the manual screw for operating the valve.

(H.) shows a free space under the valve seat, in its central part, above the fibrous packing of the tube (E.)

(I.) is a removable cup in which all the outflow of the valves is collected and discharged by the nozzle (i.) It is held in place by the catch springs (i'.) and their counterpart (b. b.)

(J.) is an oil conveying pipe with an expanded receiving end.

(K.) is a small wire partially filling the caliber of the pipe (J.)

(L.) is a vertical branch pipe and (M.) is a bowl into which oil from the tank (A.) is conveyed.

(N.) shows the fiber filling of the tubes and the drops of oil falling therefrom.

(O.) is simply a bracket supporting the mechanisms just described.

The operation of this fiber filled outlet tube or valve adjunct, also the small wire center in the oil pipe is easily understood. The fiber filling of each tube is a matter of adjustment; and the tube's filling should be adjusted without any regard to the valves as their perfect work is done independently of them. If more oil is required in an even and constant flow a tube with less compact filling will be attached and "vice versa." If the change of quantity is so great as to make it desirable, a cluster of tubes may be inclosed, as shown, in the same vessel, and when all are working, the aggregate of all will flow into the oil conveying pipe and be conveyed as provided for. Almost any kind of valve may be used with this fiber filled outlet, or adjunct, but a needle valve has the advantage of simplicity and a capacity of co-operating with the fiber filled tube as an adjunct so as to check the flow in part without entirely stopping it.

The ordinary way of using the tube as an adjunct is to wholly open the valve and let the fiber filled tube flow at the even rate it was packed and adjusted to deliver, and if more oil is required; throw open another valve. Of course the closing of all the valves shuts off the flow of oil wholly. The oil-conveying pipe (J.) provided with its air relieving wire (K.) placed permanently in its caliber secures the even, steady flow of oil through its horizontal parts to any vertical turn in the pipe or to its place of use.

Having thus fully described my invention, what I claim as new, and desire to secure by Letters Patent, is—

1. The combination of a reservoir having a discharge orifice, a drip tube in communication with said orifice and a packing in said tube substantially as described.

2. The combination of a reservoir having a number of discharge openings, drip tubes in communication with said openings, packing in said tubes and a cup having a discharge opening situated below said drip tubes substantially as described.

3. The combination of a burner, the feed tube leading thereto, a wire in said tube, and a drip reservoir for delivering oil to said tube, substantially as described.

GEO. RODNEY MOORE.

Witnesses:
JAMES F. HAGEN,
SAML. F. GILLIES.